INVENTORS
EDWIN P. ARTHUR
ERNEST N. CARLSEN
BY GEORGE W. STEVENSON
*Thomas L. Peterson*
ATTORNEY United States Patent Office 3,398,079
Patented Aug. 20, 1968

3,398,079
ELECTROCHEMICAL APPARATUS
Edwin P. Arthur, Fullerton, Ernest N. Carlsen, West Los Angeles, and George W. Stevenson, Los Angeles, Calif., assignors to Beckman Instruments, Inc., a corporation of California
Continuation-in-part of application Ser. No. 91,957, Feb. 27, 1961. This application June 4, 1964, Ser. No. 372,585
7 Claims. (Cl. 204—195)

ABSTRACT OF THE DISCLOSURE

Apparatus for analyzing small liquid samples such as blood. The apparatus comprises a body having a small passage through which the liquid sample passes. An opening communicates with the liquid passage. A sensing electrode such as a glass electrode is of such configuraton to close the opening when mounted therein. A reference electrode is coupled to the opening through a salt bridge with the salt bridge solution communicating with the sample passage via an electrolytic path provided between the surface of the sensing electrode and the opening in which it is mounted.

---

This invention relates to an apparatus for electrochemical analysis of relatively small samples of fluid, such as blood or the like. This application is a continuation-in-part of our copending application entitled "Technique in Blood Testing," Ser. No. 91,957, filed Feb. 27, 1961, now Patent No. 3,147,081, and assigned to the same assignee as the present application.

It is desirable to have an apparatus for analyzing very small samples, samples with very low flow rates, or samples flowing in very small passages. Also, it is desirable to have an apparatus for analyzing small samples accurately and on a batch or continuous basis. The present invention provides an apparatus for making such measurements and is specifically applicable for measuring the $pCO_2$ content of blood according to the method disclosed in the aforementioned copending application.

It is, therefore, the principal object of the present invention to provide an apparatus for analyzing very small samples.

A further object of the invention is to provide an apparatus for continuously measuring flowing samples.

According to the principal aspect of the present invention, a body carrying a sensing electrode and a reference electrode is provided with a small passage therethrough for receiving a liquid sample. The sensing electrode is positioned in and closes a portion of a passage communicating with the sample passage. The ion sensitive surface of the sensing electrode is positioned substantially at the sample passage so that the ion sensitive surface forms a wall of the sample passage. Means are provided for coupling the reference electrode to the passage receiving the sensing electrode so that the reference electrode is coupled to the sample passage through an electrolytic path provided between the surface of the sensing electrode and the passage receiving the sensing electrode. Accordingly, an extremely simple structure is provided in which the sensing electrode may be readily replaced by other electrodes for making different analyses of a sample and only a small sample is required which may be introduced as a discrete entity into the apparatus or may be caused to flow through the apparatus at will and be continually monitored by the electrodes associated therewith.

Other objects, aspects and advantages will become apparent from the following description taken in connection with the accompanying drawing wherein.

Figure 1:
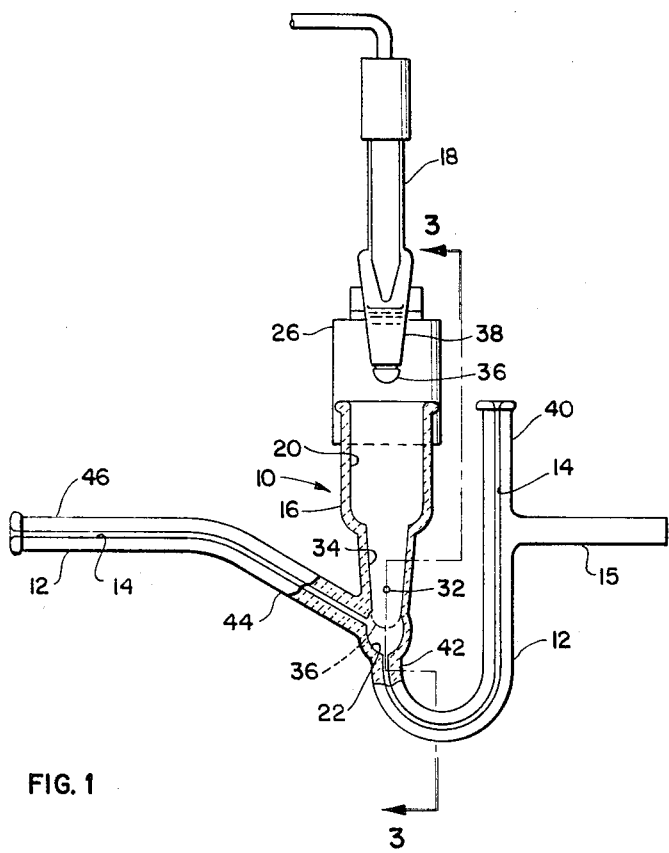
FIG. 1 is an elevational view partially in section of the apparatus of the invention with the sensing electrode removed from the apparatus.
Figure 3:
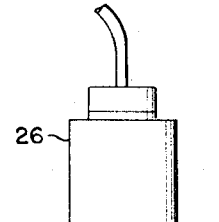
FIG. 3 is a sectional view taken along line 3—3 of FIG. 1.
Figure 2:
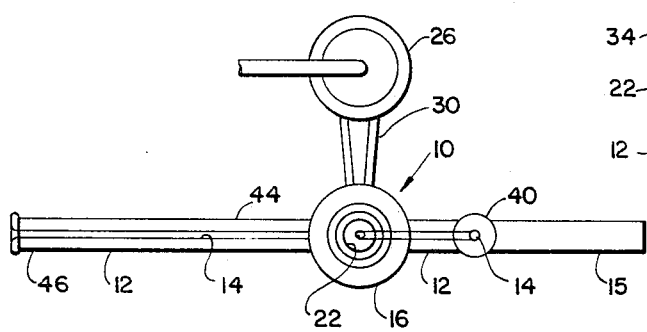
FIG. 2 is a plan view of the apparatus of FIG. 1 showing that the reference electrode is placed to one side of the apparatus.

Referring now to the drawing in detail, the apparatus of the invention comprises generally a body 10 of electrical insulating material, preferably glass, which includes a cannula 12 having a small sample passage 14 therethrough. The body 10 also includes a handle 15 formed integrally with the cannula 12 and a holder 16 for a sensing electrode 18, which is shown as a conventional glass electrode. The holder 16 has a passage or chamber 20 communicating between the exterior of the holder 16 and the sample passage 14. As best seen in FIGS. 1 and 3, the portion of the sample passage 14 adjacent the passage 20 may be enlarged to provide a small reservoir or chamber 22 which is required for forming a film of blood over the ion sensitive surface of the electrode 18 when the apparatus is used to perform the method described in our aforementioned copending application. However, it is to be understood that the reservoir 22 is not required when the apparatus of the invention is used for analyzing samples by methods other than that disclosed in said copending application.

A reference electrode 26 including an internal half cell 28 and a salt bridge tube 30 forms a part of the apparatus. The salt bridge tube 30 of the reference electrode is coupled through a very small opening 32 to the interior of the electrode holder 16. The electrode holder 16 has its lower portion 34 tapered and converging toward the passage 14 and reservoir 22 to receive the sensing electrode 18. The details of the glass electrode 18 and the reference electrode 26 need not be discussed in further detail here as they are conventional.

The glass or sensing electrode 18 has a conventional bulb of ion sensitive glass 36 which is responsive to the particular ions being measured in the sample. The lower end of the glass electrode includes a tapered male ground section 38 which, when positioned within the electrode holder 16, engages the lower interior portion 34 of the holder. With the glass electrode positioned within the electrode holder 16, the glass tip 36 assumes the position indicated in dotted lines in FIG. 1 within the sample passage 14. Thus, by the cooperating tapered surfaces 34 and 38 of the electrode holder 16 and glass electrode 18, respectively, there is provided a means for maintaining the electrode 18 in a predetermined position in the apparatus with the electrode completely closing the lower portion of the passage 20 and positioning the ion sensitive surface 36 at the sample flow passage 14. Thus, the bulb 36 forms a part of the wall of the sample passage 14 in the apparatus.

For measuring the $pCO_2$ content of blood in accordance with the method described in the aforementioned copending application, preferably the cannula 12 has a first vertical portion 40 to which the handle 15 is attached. The cannula 12 at the lower end of the first vertical portion is curved upwardly forming a short, second vertical portion 42 which houses the chamber 22. Beyond the second vertical portion 42 the cannula 12 has an upwardly sloping segment 44 which at its upper end levels off into a horizontal segment 46. In using the device for measuring $pCO_2$ of blood, the blood specimen is introduced into the top of the first vertical portion 40 of the cannula 12 by a syringe or the like. After first measuring the pH of the blood specimen, the major part of the specimen is discharged through the exit or horizontal segment 46 by applying gas pressure to the entrance end 40 of the cannula or by applying a vacuum to the exit end 46. As a result, a film of blood remains on the ion sensitive bulb 36, as explained in said aforementioned application. Carbon dioxide gas of known concentration is then introduced into the cell via the vertical portion 40 of the cannula. The reservoir 22 facilitates the equilibration of $CO_2$ with the film of blood on the bulb 36. Thereafter, a second pH observation is made, followed by still others in a like manner. If the apparatus is utilized for measuring a continuous flow of sample therethrough, it is obvious that the segments 40 and 46 thereof may be connected to suitable flow lines which convey a continuous flow of sample.

Whether a sample is introduced into the cell as a discrete body or continuously under low pressure, an extremely small portion of salt bridge electrolyte will flow from the salt bridge tube 30, between the ground surface 38 of the glass electrode 18 and the lower portion 34 of the electrode holder 16, to the reservoir 22 due to the pressure head of salt solution in the reference electrode 26. Thus, the exposed annulus of the ground glass affords a simple and effective electrolytic connection between the glass electrode 18 and the reference electrode. If clogging of the opening 32 occurs, it may be readily overcome merely by lifting the electrode 18 so that electrolyte within the salt bridge tube 30, due to the fluid pressure head therein, will flow through the opening 32 thereby removing any obstruction.

Although the instant apparatus has been described as being specifically advantageous for the measurement of $pCO_2$ of blood, the apparatus may be used for making other measurements of samples besides blood on either a batch or continuous basis. Furthermore, other sensing electrodes besides a glass electrode may be utilized, such as a conventional sensing electrode for measuring the oxidation-reduction potentials of a sample. Furthermore, the cannula 12 and electrode holder 16 need not necessarily be separate components fixed together but instead the passages 14 and 20 may be provided in a block of electrical insulating material which has suitably arranged passages for receiving a sensing electrode and a reference electrode.

Although several embodiments of the invention have been disclosed herein for purposes of illustration, it will be understood that various changes can be made in the form, details, arrangement and proportion of the various parts in such embodiments without departing from the spirit and scope of the invention as defined by the appended claims.

What is claimed is:

1. In an apparatus for electrochemical measurements, the combination of:
    a body of electrical insulating material having a sample passage therethrough and a second passage communicating between said sample passage and the exterior of said body;
    a sensing electrode having an ion sensitive surface at an end, said sensing electrode being positioned in and closing at least the portion of said second passage adjacent to said sample passage with said end positioned substantially at said sample passage;
    a reference electrode; and
    means coupling said reference electrode to said portion of said second passage thereby providing an electrolytic path between said sample passage and said reference electrode.

2. An apparatus as set forth in claim 1 wherein said body includes means for maintaining said sensing electrode in a predetermined position in said sample passage.

3. In an apparatus for electrochemical measurements, the combination of:
    a body of electrical insulating material having a sample passage therethrough and a second passage communicating between said sample passage and the exterior of said body, said second passage having a taper converging toward said sample passage;
    a sensing electrode having an ion sensitive surface at an end, said sensing electrode being positioned in said second passage and having a mating taper for closing said second passage and fixing said end in a predetermined position substantially at said sample passage;
    a reference electrode; and
    means coupling said reference electrode to said second passage with said sensing electrode taper and second passage taper cooperating to provide an electrolytic path between said sample passage and said coupling means.

4. An apparatus as set forth in claim 3 wherein one of said tapers has a ground surface.

5. An apparatus as set forth in claim 3 wherein said sensing electrode is a glass electrode.

6. An apparatus as set forth in claim 3 wherein said sample passage is enlarged at said end of said sensing electrode to facilitate the formation of a film of sample on said ion sensitive surface when a gas is passed through said sample passage subsequent to the insertion of sample therein.

7. In an apparatus for electrochemical measurements, the combination of:
    a cannula of electrical insulating material having a sample passage therethrough;
    electrode holder means of electrical insulating means fixed to said cannula and having a second passage therethrough communicating with said sample passage, said second passage having a taper converging toward said sample passage;
    a sensing electrode having an ion sensitive surface at an end, said sensing electrode being positioned in said second passage and having a mating taper for closing said second passage and fixing said end in a predetermined position substantially at said sample passage;
    a reference electrode including a salt bridge tube and an internal half cell, said salt bridge tube being fixed to said electrode holder means at a position adjacent said second passage taper; and
    said electrode holder means having an opening communicating between said second passage taper and the interior of said salt bridge tube, said second passage taper and said sensing electrode taper cooperating to provide an electrolytic path between said sample passage and said opening.

References Cited

UNITED STATES PATENTS

| | | | |
|---|---|---|---|
| 2,607,718 | 8/1952 | Suthard | 23—230 X |
| 2,782,151 | 2/1957 | Suthard | 204—195 X |
| 3,151,052 | 9/1964 | Arthur et al. | 324—30 X |

MORRIS O. WOLK, *Primary Examiner.*

R. E. SERWIN, *Assistant Examiner.*